E. E. NUNN.
MOTOR VEHICLE JACK.
APPLICATION FILED AUG. 30, 1916.
1,250,341.
Patented Dec. 18, 1917.
2 SHEETS—SHEET 1.
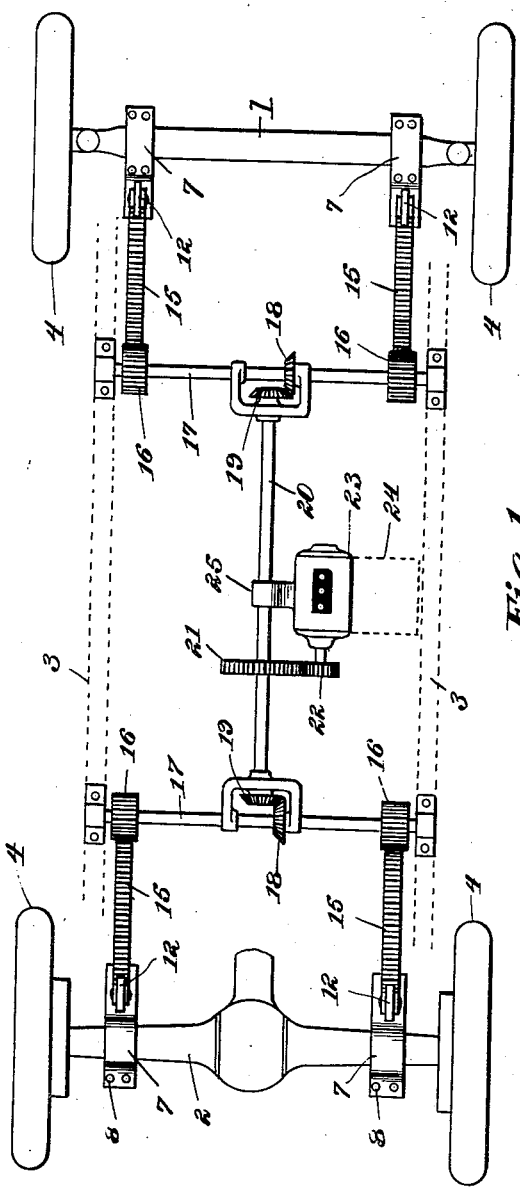
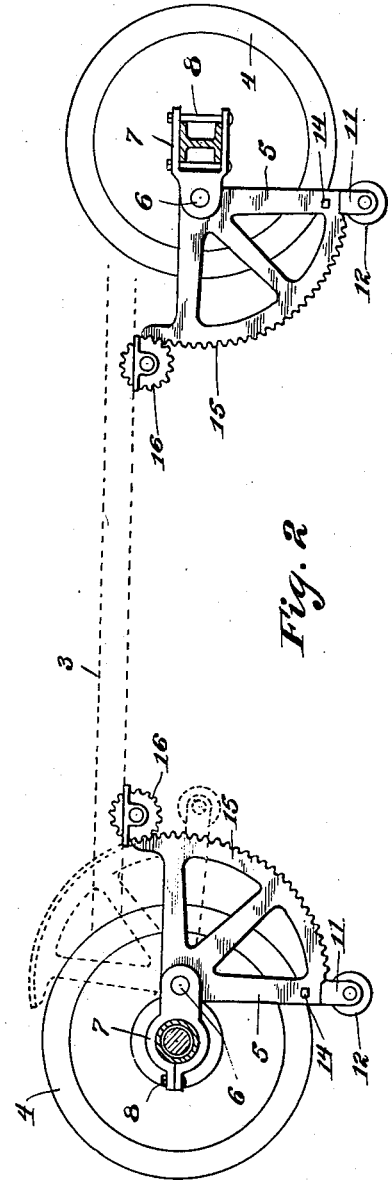
Witnesses
C. F. Rudolph.
R. M. Smith.
Inventor
E. E. Nunn,
By Victor J. Evans
Attorney

E. E. NUNN.
MOTOR VEHICLE JACK.
APPLICATION FILED AUG. 30, 1916.

1,250,341.

Patented Dec. 18, 1917.
2 SHEETS—SHEET 2.

Witnesses
C. F. Rudolph
P. M. Smith

Inventor
E. E. Nunn,
By Victor J. Evans
Attorney

UNITED STATES PATENT OFFICE.

ELBERT E. NUNN, OF MALVERN, ARKANSAS.

MOTOR-VEHICLE JACK.

1,250,341.  Specification of Letters Patent.  Patented Dec. 18, 1917.

Application filed August 30, 1916. Serial No. 117,756.

*To all whom it may concern:*

Be it known that I, ELBERT E. NUNN, a citizen of the United States, residing at Malvern, in the county of Hot Springs and State of Arkansas, have invented new and useful Improvements in Motor-Vehicle Jacks, of which the following is a specification.

This invention relates to motor vehicle jacks, the object of the invention being to provide novel jack mechanism in connection with a motor driven vehicle, whereby, with the aid of the usual storage battery, a reversible electric motor, and a series of jack arms, one, two or more of the wheels may be elevated until the tire or tires are out of contact with the ground or supporting surface.

By the construction and arrangement hereinafter described, a single wheel may be elevated for the purpose of changing or repairing a tire or all of the wheels may be simultaneously elevated when a car is parked or stored in a garage and not desired for immediate use.

With the above and other objects in view, the invention consists in the novel construction, combination and arrangement, herein fully described, illustrated and claimed.

In the accompanying drawings:—

Figure 1 is a bottom plan view of a sufficient portion of an automobile to illustrate the improved jack mechanism in its applied relation thereto.

Fig. 2 is a vertical longitudinal section through the same.

Figure 3:
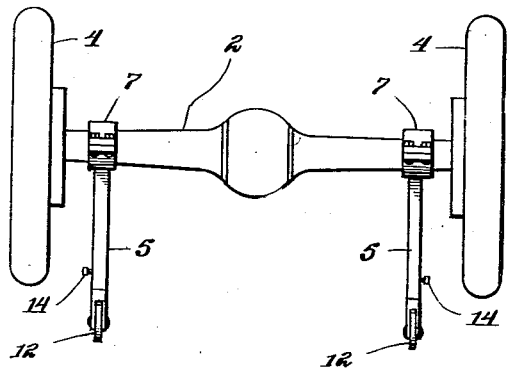
Fig. 3 is an end elevation thereof.

Referring to the drawings, 1 and 2 designate the front and rear axles of a motor vehicle, 3 the frame and 4 the wheels.

In carrying out this invention, in the preferred embodiment thereof, I employ four jack arms 5 each of which is connected by a horizontal pivot 6 to a jack arm support 7 which is shown in the form of a clip embracing one of the axles 1 and 2 as shown in Fig. 2, each clip being clamped to the respective axle by means of bolts 8 or the equivalent thereof.

Figure 5:
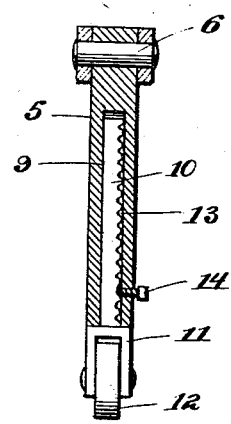
Fig. 5 is a fragmentary section on the line 5—5 of Fig. 4.

Each jack arm 5 is provided with a longitudinal bore 9 in the free end thereof in which is slidably arranged the shank 10 of a fork 11 in which is journaled a roller 12. The shank 10 is formed with a longitudinal series of sockets or indentations 13 any one of which is adapted to receive and be engaged by the inner extremity of a set screw 14 inserted through the jack arm 5 as shown in Fig. 5. This enables the roller 12 to be raised or lowered so that the vehicle wheel adjacent thereto may either remain in contact with the ground, floor or other supporting surface or be elevated therefrom, all depending upon the adjustment of the roller 12. In fact the jack arm is thus longitudinally extensible and may be either short enough not to have any elevating effect on the adjacent wheel or it may be made of sufficient length to raise said wheel so that the tire will be clear of the supporting surface.

Figure 4:
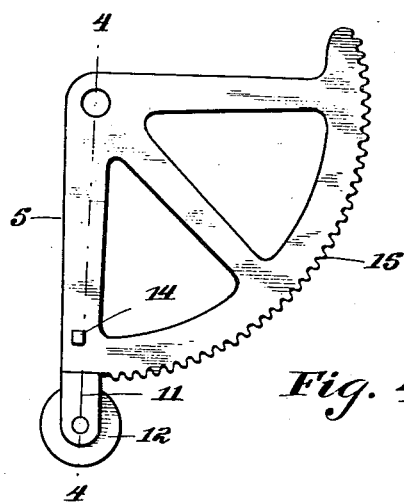
Fig. 4 is a fragmentary side elevation on an enlarged scale of one of the jack arms and sector gears.

In conjunction with each jack arm 5, I employ a sector gear 15 which in the preferred embodiment of the invention is formed integrally with the jack arm 5 as shown in Figs. 2 and 4. Each jack is in the shape of a quadrant having a toothed periphery which forms a sector gear face. The shank 10 of the extension fork 11 is parallel to and slidable within one of the straight marginal end bars of said frame. Meshing with said sector gear 15 is a pinion 16. As shown in Fig. 1, the pinions 16 which operate oppositely located sector gears 15, are mounted fast on a pinion shaft 17 extending transversely of the frame of the machine. Two of such pinion shafts 17 are employed in connection with the four sector gears and jack arms. The shafts 17 also have fast thereon bevel gears 18 which mesh with and are driven by other bevel gears 19 fast on the opposite extremities on a longitudinally extending shaft 20 which is connected by gears 21 and 22 to a reversible electric motor conventionally shown at 23, said motor being supported by a bracket 24 fastened to the machine frame. If desired the frame of the motor 23 may carry a bearing 25 for the jack shaft 20.

Figure 6:
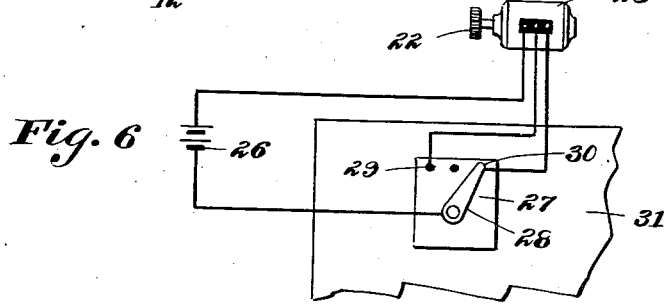
Fig. 6 is a diagrammatic view of the jack motor and wiring system.

The wiring diagram illustrated in Fig. 6 shows that the reversible electric motor 23 is connected with the usual storage battery 26 used in the present day automobiles for electric starting and lighting and also a reversing or polarity changing switch 27 comprising the movable switch arm 28 and the contacts 29 and 30 arranged in spaced relation to each other on a switch board 31 which is preferably arranged on the instrument board or cowl of the vehicle.

From the foregoing description taken in connection with the accompanying drawings the operation of the jack mechanism will now be understood. The length of the jack arms 5 taken in conjunction with the extensible members 10 and rollers 12 is such that when the rollers 12 are moved inwardly toward the pivots 6 as far as they will go, the jack arms will be ineffective when moved downwardly, as the rollers will not come in contact with the supporting surface. When it is desired to raise one of the wheels, the extensible member 10 is adjusted so as to move the roller 12 downwardly to such an extent that when the jack arm 5 is swung downwardly by the actuating mechanism hereinabove described, the roller 12 will contact with the supporting surface and lift the respective wheel until the tire thereof clears said supporting surface. In the same manner two or more of the wheels may be simultaneously elevated and by lowering all of the rollers 12, all four of the wheels of the vehicle may be simultaneously raised which will be found highly desirable when parking a car or storing the same in a garage. Not only will the weight be removed from the tires but the mechanism will prevent the car from being stolen as it cannot be operated with the driving wheels out of contact with the road surface. It will of course be understood that all of the jack arms are simultaneously operated from the reversible motor 23 but only the arm or arms having the rollers thereof lowered will become effective as jacks. When the motor is reversed all of the jack arms are moved from the full line position of Fig. 2 to the dotted line position of the same figure so that the rollers will be positioned substantially as high as the axles of the vehicle.

While I have referred to electrical power for operating the jacks, it will of course be apparent that the jacks may be operated by the power of the engine of the vehicle by means of suitable gearing interposed between the engine and the jack operating mechanism whereby all of the jacks are simultaneously operated. Any practical means may be employed for shifting the jacks toward and from their operative positions.

I claim:

1. The combination with a motor vehicle, of a jack arm pivotally connected to a fixed part of the vehicle to swing on an axis parallel to the vehicle axles, a roller carried by said jack arm and journaled on an axis parallel to the vehicle axles, a sector gear having a fixed relation to said jack arm, a pinion meshing with said sector gear, and a reversible electric motor for driving said pinion.

2. The combination with a motor vehicle, of a jack arm for each wheel pivotally connected to a fixed part of the vehicle and adapted to swing in a substantially vertical plane and on an axis parallel to the vehicle axles, a sector gear for each jack arm having a fixed relation thereto, a reversible motor, a jack shaft driven thereby, pinion shafts parallel to the vehicle axles and driven by said jack shaft, and pinions on the last named shafts meshing with and actuating said sector gears, whereby all of the jack arms are simultaneously operated by said motor, each of said jack arms having a roller at its free end rotatable on an axis parallel to the vehicle axles.

3. The combination with a motor vehicle, of a jack pivotally connected to a fixed part of the vehicle and adapted to swing in a substantially vertical plane on an axis parallel to the vehicle axles, said jack being of quadrantal shape and having the periphery thereof toothed, a jack actuating pinion meshing with said toothed periphery of the jack, and a roller carried by said jack and positioned beyond the toothed periphery of the jack and adjacent to one of the outer corners thereof, said roller being journaled to turn on an axis parallel to the axis of the jack.

In testimony whereof I affix my signature.

ELBERT E. NUNN.